(12) United States Patent
Zhou et al.

(10) Patent No.: US 10,156,968 B2
(45) Date of Patent: Dec. 18, 2018

(54) METHOD AND SYSTEM FOR DISPLAYING RECOMMENDED PAGES BY TERMINAL DEVICE

(71) Applicant: TENCENT TECHNOLOGY (SHENZHEN) COMPANY LIMITED, Shenzhen (CN)

(72) Inventors: Bin Zhou, Shenzhen (CN); Sen Sheng, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 449 days.

(21) Appl. No.: 14/929,488

(22) Filed: Nov. 2, 2015

(65) Prior Publication Data
US 2016/0054875 A1    Feb. 25, 2016

Related U.S. Application Data

(63) Continuation of application No. PCT/CN2013/090027, filed on Dec. 20, 2013.

(30) Foreign Application Priority Data

May 2, 2013 (CN) .......................... 2013 1 0158479

(51) Int. Cl.
G06F 3/0483 (2013.01)
G06F 17/30 (2006.01)
G06F 3/0484 (2013.01)

(52) U.S. Cl.
CPC ........ G06F 3/0483 (2013.01); G06F 3/04842 (2013.01); G06F 17/30899 (2013.01)

(58) Field of Classification Search
CPC ........ G06F 17/30899–17/30905; G06F 3/048; G06F 9/4443–9/4448; G06F 9/451–9/454
See application file for complete search history.

(56) References Cited

U.S. PATENT DOCUMENTS 7,843,427 B2 * 11/2010 Ording ................ G06F 3/04886
345/157
8,977,966 B1 * 3/2015 Saurav ...................... G06F 3/00
345/172

(Continued)

FOREIGN PATENT DOCUMENTS

CN    102141986 A    8/2011
CN    102236655 A    11/2011

OTHER PUBLICATIONS

International Preliminary Report for Application No. PCT/CN2013/090027 dated Nov. 12, 2015.

(Continued)

*Primary Examiner* — Jennifer N To
*Assistant Examiner* — Liang Y Li
(74) *Attorney, Agent, or Firm* — Harness, Dickey & Pierce, P.L.C.

(57) ABSTRACT

Displaying a recommended page by a terminal device may include page presenting recommended information being displayed. Click information of a click operation is captured, which is performed by a user on a display area of the recommended information via a display screen. The page includes a calculated hotspot range. The hotspot range is a range determined after analyzing previous click information and valid information, where a valid click probability is greater than a probability set value. Whether the click operation is valid may be determined based on the click information and the hotspot range. When determining that the click operation is valid, a request for obtaining the recommended page corresponding to the recommended information may be transmitted to a server.

9 Claims, 4 Drawing Sheets

(56) References Cited

U.S. PATENT DOCUMENTS

| | | | |
|---|---|---|---|
| 2009/0019394 A1 | 1/2009 | Sekimoto et al. | |
| 2011/0087966 A1* | 4/2011 | Leviathan | G06F 17/30905 |
| | | | 715/745 |
| 2012/0280827 A1 | 11/2012 | Kashiwagi et al. | |
| 2013/0067382 A1* | 3/2013 | Townsend | G06F 3/04895 |
| | | | 715/773 |
| 2014/0040772 A1* | 2/2014 | Murata | G06F 3/0482 |
| | | | 715/753 |
| 2015/0302466 A1* | 10/2015 | Huang | G06F 17/30905 |
| | | | 705/14.45 |

OTHER PUBLICATIONS

International Search Report for Application No. PCT/CN2013/090027 dated Mar. 27, 2014.

Chinese Office Action for Application No. 2013101584797 dated Aug. 2, 2017, and an English concise explanation of relevance thereof.

\* cited by examiner

METHOD AND SYSTEM FOR DISPLAYING RECOMMENDED PAGES BY TERMINAL DEVICE

CROSS-REFERENCE TO RELATED APPLICATIONS

This application is a continuation of International Application No. PCT/CN2013/090027, filed Dec. 20, 2013. This application claims the benefit and priority of Chinese Application No. 201310158479.7, filed May 2, 2013. The entire disclosures of each of the above applications are incorporated herein by reference.

FIELD

The present disclosure relates to information transmission technologies and to display recommended pages by a terminal device.

BACKGROUND

This section provides background information related to the present disclosure which is not necessarily prior art.

A terminal device may transmit a request to a server for page information about a certain service. After receiving the request, the server may report a corresponding page to the terminal device. There may be a location left in the page, so as to display recommended information. After the terminal device displays the page including the recommended information, a user may touch and click a display area of the recommended information based on requirements, so as to jump to a recommended page. Subsequently, based on requirements, the user may further perform operations on the recommended page, such as click a link address and picture on the page, so as to view more detailed contents, or click so as to download software, and so on.

Since the area of a display screen interface of a terminal device may be small, an incorrect click may easily occur by a user with a larger finger. After clicking in error, the display screen may jump to a recommended page. Since this is the result of an incorrect click, the user may immediately exit from the recommended page and not perform subsequent operations on the recommended page.

A lower valid click probability of recommended information may result from the scenario of an incorrect click by a user with a larger finger. Since the valid click probability is lower, the subsequent efficiency of displaying recommended information may be not determined based on the valid click probability. As a result, subsequent maintenance and improvement may be not be executed. In a scenario where it is not necessary for a recommended page to be displayed, exit operations of a recommended page may be executed after an incorrect click of a finger, and a previous page may be returned. The operations may be very complicated.

SUMMARY

This section provides a general summary of the disclosure, and is not a comprehensive disclosure of its full scope or all of its features.

Various embodiments of the present disclosure provide a method for displaying recommended pages by a terminal device, which may improve the efficiency of displaying recommended pages by the terminal device.

Various embodiments of the present disclosure provide a system for displaying recommended pages by a terminal device, which may improve the efficiency of displaying recommended pages by the terminal device.

A method for displaying a recommended page by a terminal device, includes the following.

displaying a page carrying recommended information;

capturing click information of a click operation, which is performed by a user on a display area of the recommended information via a display screen;

wherein the page further comprises a hotspot range determined, the hotspot range is a range determined after analyzing previous click information and valid information, where a valid click probability is greater than a probability set value, the valid information is correct operation information for effectively displaying the recommended information;

determining whether the click operation is valid, based on the click information and the hotspot range;

when determining that the click operation is valid, transmitting a request for obtaining the recommended page corresponding to the recommended information to a server; and displaying the recommended page obtained.

A system for displaying a recommended page by a terminal device, wherein the system includes a terminal device and a server;

the terminal device is configured to display a page carrying recommended information, capture click information of a click operation, which is performed by a user on a display area of the recommended information via a display screen, wherein the page further comprises a hotspot range determined, the hotspot range is a range determined after analyzing previous click information and valid information, where a valid click probability is greater than a probability set value, the valid information is correct operation information for effectively displaying the recommended page;

the terminal device is further configured to determine whether the click operation is valid, based on the click information and the hotspot range;

when determining that the click operation is valid, the terminal device is further configured to transmit a request for obtaining the recommended page corresponding to the recommended information to the server, and display the recommended page obtained;

the server is configured to receive the click information from the terminal device, analyze the previous click information and the valid information, determine a range where the valid click probability is greater than the probability set value, and take the range determined as the hotspot range;

when pushing the page carrying the recommended information to the terminal device, the server is further configured to enable the page to carry the hotspot range determined, receive the request for displaying the recommended page from the terminal device, and push the recommended page to the terminal device for displaying.

From the foregoing technical methods, it can be seen that, in the present disclosure, based on the click information of a click operation performed by a user on a display area of recommended information, as well as corresponding valid information, a hotspot range is analyzed, where the valid click probability is greater than the probability set value. Subsequently, when clicking recommended information, whether the click operation is valid may be determined based on the click information and hotspot range. When determining that the click operation is valid, a request for converting recommended pages may be transmitted to a server. Thus, by using the foregoing mode to determine whether the click operation is valid, the efficiency of displaying recommended pages by a terminal device may be improved. Reliability of executing subsequent maintenance and improvement based on the foregoing efficiency may also be enhanced. Additionally, in the scenario where it is not necessary to display a recommended page, page return operations executed after an incorrect click of a finger may be reduced, and the method may be simplified.

Further areas of applicability will become apparent from the description provided herein. The description and examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

For simplicity and illustrative purposes, the present disclosure is described by referring mainly to various embodiments. In the following description, numerous details are set forth in order to provide a thorough understanding of the present disclosure. It will be readily apparent however, that the present disclosure may be practiced without limitation to these details. In other instances, some methods and structures have not been described in detail so as not to unnecessarily obscure the present disclosure. As used throughout the present disclosure, the term "includes" means includes but not limited to, the term "including" means including but not limited to. The term "based on" means based on at least in part. In addition, the terms "a" and "an" are intended to denote at least one of a particular element.

In the present disclosure, based on the click information of a click operation performed by a user on a display area of recommended information, as well as corresponding valid information, a hotspot range where valid click probability is greater than the probability set value may be analyzed. Subsequently, when clicking the recommended information, whether the click operation is valid may be determined based on the click information and the hotspot range. When determining that the click operation is invalid, a request for converting a recommended page may be not transmitted to a server. When determining that the click operation of the user is valid, jump to the recommended page. The user may then further perform operations on the recommended page, e.g., click an address link or click a picture on the page, so as to view more detailed contents. The user may also click to download software, click to trade and negotiate, and so on.

Thus, by employing the foregoing mode to determine whether a click operation is valid, the efficiency of displaying a recommended page by a terminal device may be improved.

Figure 1:
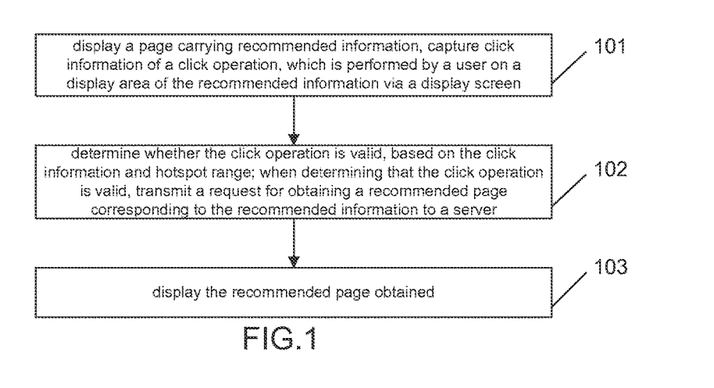
FIG. 1 is a flowchart illustrating a method for displaying recommended pages by a terminal device, according to various embodiments.

With reference to FIG. 1, FIG. 1 is a flowchart illustrating a method for displaying a recommended page by a terminal device, according to various embodiments of the present disclosure. The method may include the following blocks.

Block 101: Display a page including recommended information and capture the click information of a click operation performed by a user on a display area of recommended information via a display screen.

A terminal device may transmit a request to a server for page data of a certain service. After receiving the request, the server may report a corresponding page to the terminal device. The terminal device may then display the page. For a service, a fixed location of a page may display the recommended information. After the terminal device displays the page including the recommended information based on user requirements, a user may touch and click the display area of the recommended information, so as to jump to the recommended page. After capturing the click information of the click operation performed by the user on the display area of recommended information via the display screen, the terminal device transmits the click information to the server.

The page may further include a determined hotspot range. The hotspot range refers to a range determined after analyzing previous click information and valid information, and in the foregoing range, valid click probability is greater than the probability set value. The valid information refers to correct operation information for effectively displaying the recommended information.

After receiving the click information fed back or reported by the terminal device, the server may execute analysis combined with the valid information. Regarding click information, after pushing a recommended page to a user, when the user has performed further operations on the recommended page, it is a valid operation; otherwise, it is an invalid operation. In actual operations, click information and corresponding valid information recorded within a certain time period, such as recorded within a month, may be extracted and analyzed, so as to determine a hotspot range where the valid click probability is greater than the probability set value. The valid click probability refers to a ratio of the number of valid operations to a total number of operations within a specified time period. The total number of operations refers to the sum of the number of times a valid operation occurred and the number of times an invalid operation occurred. It should be noted that, the click information and valid information analyzed refer to terminal devices of the same model with the same location of the same service page used for placing the recommended information. Information, such as model information, may be provided for the server during the process of accessing a page. The probability set value in the block may be set based on requirements.

Block 102: Determine whether the click operation is valid based on the click information and hotspot range. When determining that the click operation is valid, transmit a request to the server, so as to obtain the recommended page corresponding to the recommended information.

Block 103: Display the recommended page obtained.

When determining that the click operation is invalid, the request for obtaining the recommended page corresponding to the recommended information may be not transmitted to the server.

During the process of determining whether the click operation is valid, the click probability of a current click operation, which may be referred to as valid probability S0, may be calculated first based on the click information and hotspot range. Whether the click operation is valid may then be determined based on the valid probability S0.

There are various implementation modes to determine whether the click operation is valid, which may be set based on requirements. Three implementation modes will be provided in the following.

A first mode may be as follows. The click information may include click location information. The hotspot range may include a hotspot area range. The hotspot area range refers to a location area range, where the valid click probability is greater than an area set threshold.

The process of determining whether the click operation is valid may include the following.

Figure 2:
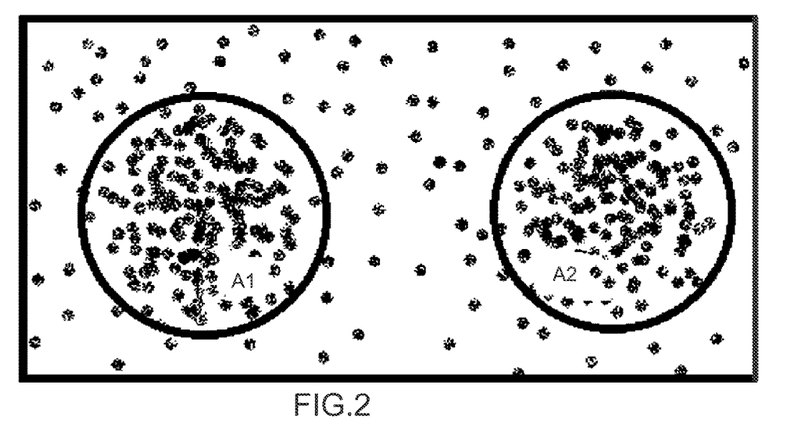
FIG. 2 is a diagram illustrating determined hotspot area instances, according to various embodiments.

Calculate a hotspot area probability S1, which may include the following. Calculate a distance L between a click operation location and a center of the hotspot area range. Then, calculate the hotspot area probability S1 based on S1=1/L or determine whether the click operation location is within the hotspot area range. When determining that the click operation location is within the hotspot area range, the value of S1 may be 1; otherwise, calculate the distance L between the click operation location and the center of the hotspot area range, S1=1/L. That is, the value of S1 may be less, accompanied with greater L. Take the hotspot area probability S1 as the valid probability S0. Determine whether the click operation is valid, based on the valid probability S0. The method for determining the hotspot area range may be as follows. Take each location within the display area of recommended information as a center of a circle. Take a length value less than half of the height of the display area of recommended information as a radius. Traverse the display area of the recommended information. Record the statistics on the valid click probability within each circular area. Take n circular area ranges with the maximum valid click probability as the hotspot area range, in which n is a natural number, such as 2. With reference to FIG. 2, circular area ranges marked with A1 and A2 in the figure are the determined hotspot area range. In FIG. 2, descriptions may be provided according to various embodiments, in which the hotspot area is a circle. Other shapes may also be employed, such as a square.

A second mode is as follows. The click information may include the click duration information. The hotspot range may include a hotspot duration range. The hotspot duration range is a duration range, where the valid click probability is greater than the probability set value. The hotspot duration range may be denoted with a duration range greater than T0.

The process of determining whether the click operation is valid may include the following. Calculate a time hotspot probability S2, which may include the following. Calculate based on formula S2=1/(T0−t) by using the click duration t and obtain the time hotspot probability S2. Alternatively, determine whether the click duration t is greater than or equal to the hotspot duration. When determining that the click duration t is greater than or equal to the hotspot duration, the value of S2 may be 1; otherwise, S2=1/(T0−t).

That is, the probability value may be less, accompanied with a greater difference between the touch duration and T0. Take the time hotspot probability S2 as the valid probability S0. Determine whether the click operation is valid based on the valid probability S0.

Figure 3:
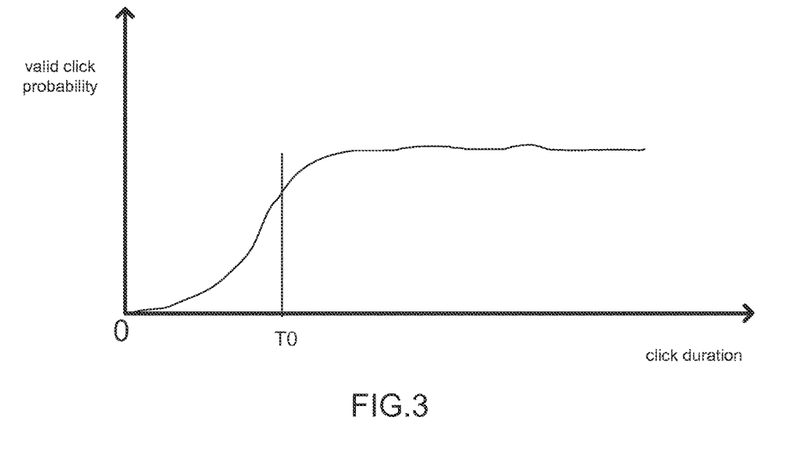
FIG. 3 is a diagram illustrating variation of a curve between click time and valid click probability, according to various embodiments.

For example, a method for determining the hotspot duration range may be as follows. Analyze the valid click probability corresponding to each click duration within the display area of the recommended information and obtain a change relationship between the click duration and the valid click probability. Take a duration, the valid click probability of which trends to be stable, as a duration hotspot. Take a range greater than or equal to the duration hotshot as the hotspot duration range. With reference to FIG. 3, FIG. 3 is a diagram illustrating the variation of a curve between the click duration and the valid click probability, according to various embodiments of the present disclosure. The valid click probability refers to a probability for executing a valid operation within the corresponding click duration. For example, the valid click probability may be denoted with the number of times there are valid operations within a certain click duration, which has been obtained after recording statistics within a time period. In the figure, T0 is a minimum value of touch time, the valid click probability of which is greater than the probability set value. A time range, which is greater than T0, refers to the hotspot duration range.

A third mode is as follows. The click information may include click location information and click duration information. The hotspot range may include a hotspot area range and a hotspot duration range. The hotspot area range refers to a location area range, where the valid click probability is greater than an area set threshold. The hotspot duration range is a duration range, where the valid click probability is greater than the probability set value. The hotspot duration range refers to a duration range greater than T0.

The process of determining whether the click operation is valid may include calculating the hotspot area probability S1, which may include the following. Calculate a distance L between the click operation location and a center of the hotspot area range. Then, calculate the hotspot area probability S1 based on the formula S1=1/L or determine whether the click operation location is within the hotspot area range. When determining that the click operation location is within the hotspot area range, the value of S1 is 1; otherwise, S1=1/L.

Calculating the time hotspot probability S2, which may include the following. Calculate S2=1/(T0−t) by using the click duration t. Alternatively, determine whether the click duration t is greater than or equal to the hotspot duration. When determining that the click duration t is greater than or equal to the hotspot duration, the value of S2 is 1; otherwise, S2=1/(T0−t).

Calculating the valid probability S0 may include: S0=a*S1+b*S2. Determine whether the click operation is valid based on the valid probability S0.

The foregoing "a" and "b" are two coefficients with constant weights. The values of "a" and "b" may be determined by influence on the valid click probability, which is generated by area factor and duration factor of the click operation. For example, the values of "a" and "b" are both 50%.

There are various implementation modes to determine whether the click operation is valid, based on the valid probability S0. For example, whether the click operation is valid may be directly determined based on the valid probability S0 or may be determined by taking into account a random number. The foregoing process may include the following. Determine a random number S between 1 and 100, such as 40, 65 or 70, and so on. Determine whether S is less than S0*100. When determining that S is less than S0*100, determine that the click operation is valid; otherwise, determine that the click operation is invalid.

When determining that a user's click is a valid operation, jump to a recommended page. The user may then further perform operations on the recommended page, e.g., click an address link or a picture on the page, so as to view more detailed contents, click to download software, click to trade and negotiate, and so on.

During implementations, embed JavaScript codes of recommended information in the page, so as to facilitate the operations, such as obtain click information and analyze hotspot range.

In the present disclosure, based on click information of a click operation performed by a user on the display area of recommended information, as well as corresponding valid information, analyze the hotspot range, where the valid click probability is greater than the probability set value. Subsequently, when clicking the recommended information, determine whether the click operation is valid, based on the click information and the hotspot range. When determining that the click operation is invalid, a request for converting the recommended page may be not transmitted to the server. Thus, by using the foregoing mode for determining whether the click operation is valid, the efficiency of displaying a recommended page by a terminal device may be improved. The reliability of subsequent maintenance and improvement based on the foregoing efficiency may also be enhanced. Additionally, for a scenario where it is not necessary to display a recommended page, the page return operations executed after an incorrect click of a user's finger may be reduced and the methods may be simplified.

Figure 4:
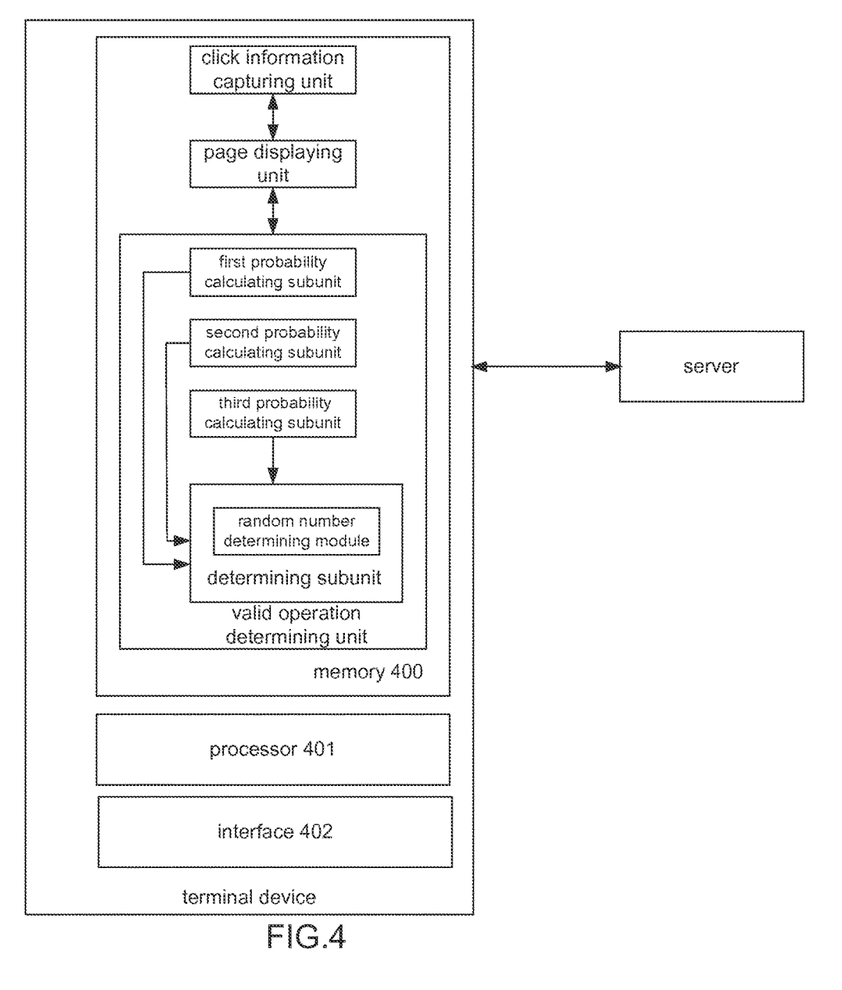
FIG. 4 is a diagram illustrating structure of a system for displaying recommended pages by a terminal device, according to various embodiments.

With reference to FIG. 4, FIG. 4 is a diagram illustrating the structure of a system for displaying recommended pages by a terminal device, according to various embodiments of the present disclosure. The system may include a terminal device and a server. The terminal device is configured to display a page including the recommended information, capture the click information of a click operation, which is performed by a user on a display area of the recommended information via a display screen. The page may further include a determined hotspot range. The hotspot range is a range determined after analyzing previous click information and valid information. The hotspot range is a range where the valid click probability is greater than the probability set value. The valid information is correct operation information for effectively displaying recommended pages. Whether the click operation is valid may be determined by the click information and hotspot range. When determining that the click operation is valid, the terminal device may transmit a request for obtaining a recommended page corresponding to the recommended information of the server, and display the obtained recommended page.

The server is configured to receive the click information from the terminal device, analyze previous click information and valid information, determine a range where the valid click probability is greater than the probability set value, and take the determined range as the hotspot range. When sending a page including the recommended information to the terminal device, the server is further configured to enable the page to carry the determined hotspot range. The server is further configured to receive a request for displaying a recommended page from the terminal device and push the recommended page to the terminal device for displaying.

The terminal device may include a memory 400, a processor 401 in communication with the memory 400, and an interface 402. The memory 400 may store a page displaying unit, a click information capturing unit, and a valid operation determining unit, which are executable by the processor 401. When being executed by the processor 401, the page displaying unit is configured to display a page received from the server via the interface 402, which includes the recommended information and the hotspot range, and transmit the hotspot range to the valid operation determining unit. When being executed by the processor 401, the click information capturing unit is configured to capture click information of a click operation, which is performed by a user on a display area of recommended information via a display screen, and transmit the click information to the server and the valid operation determining unit via the interface 402. When being executed by the processor 401, the valid operation determining unit is configured to determine whether the click operation is valid, based on the click information and hotspot range. When determining that the click operation is valid, the valid operation determining unit is further configured to transmit a request for obtaining a recommended page corresponding to the recommended information to the server, and display the obtained recommended page.

The click information may include click location information. The hotspot range may include a hotspot area range. The hotspot area range is a location area range, where the valid click probability is greater than an area set threshold. The valid operation determining unit may include a first probability calculating subunit and a determining subunit, which are executable by the processor 401. When being executed by the processor 401, the first probability calculating subunit is configured to calculate a distance L between the click operation location and a center of the hotspot area range, and then calculate the hotspot area probability $S1$, based on $S1=1/L$. Alternatively, the first probability calculating subunit is configured to determine whether the click operation location is within the hotspot area range. When determining that the click operation location is within the hotspot area range, the value of $S1$ is 1; otherwise, the first probability calculating subunit is further configured to calculate the distance L between the click operation location and the center of the hotspot area range, $S1=1/L$, take the hotspot area probability $S1$ as the valid probability $S0$, and transmit to the determining subunit. When being executed by the processor 401, the determining subunit is configured to determine whether the click operation is valid, based on the valid probability $S0$.

The click information may include the click duration information. The hotspot range may include a hotspot duration range. The hotspot duration range is a duration range, where the valid click probability is greater than the probability set value. The hotspot duration range is a duration range greater than T0. The valid operation determining unit may include a second probability calculating subunit and a determining subunit, which are executable by the processor 401.

When being executed by the processor 401, the second probability calculating subunit is configured to calculate based on the formula $S2=1/(T0-t)$, by using click duration t, and obtain a time hotspot probability $S2$. Alternatively, the second probability calculating subunit is configured to determine whether the click duration t is greater than or equal to the hotspot duration. When determining that the click duration t is greater than or equal to the hotspot duration, the value of $S2$ may be 1; otherwise, $S2=1/(T0-t)$. The second probability calculating subunit is further configured to take the time hotspot probability S2 as the valid probability S0, and transmit to the determining subunit. When being executed by the processor 401, the determining subunit is configured to determine whether the click operation is valid, based on the valid probability S0.

The click information may include click location information and click duration information. The hotspot range may include a hotspot area range and a hotspot duration range. The hotspot area range is a location area range, where the valid click probability is greater than an area set threshold. The hotspot duration range is a duration range, where the valid click probability is greater than the probability set value. The hotspot duration range may be denoted by a duration range greater than T0. The valid operation determining unit may include a third probability calculating subunit and a determining subunit, which are executable by the processor 401.

When being executed by the processor 401, the third probability calculating subunit is configured to calculate the hotspot area probability S1, which may include the following. Calculate the distance L between the click operation location and the center of the hotspot area range, and then calculate the hotspot area probability S1 based on $S1=1/L$. Alternatively, the third probability calculating subunit is configured to determine whether the click operation location is within the hotspot area range. When determining that the click operation location is within the hotspot area range, the value of S1 may be 1; otherwise, $S1=1/L$. The process of calculating the time hotspot probability S2 may include the following. Calculate based on the formula $S2=1/(T0-t)$, by using the click duration t, and obtain the time hotspot probability S2. Alternatively, determine whether the click duration t is greater than or equal to the hotspot duration. When determining that the click duration t is greater than or equal to the hotspot duration, the value of S2 may be 1; otherwise, $S2=1/(T0-t)$. Calculate the valid probability S0, which may include $S0=a*S1+b*S2$, in which "a" and "b" are two coefficients with constant weights. Transmit the calculated valid probability S0 to the determining subunit. When being executed by the processor 401, the determining subunit is configured to determine whether the click operation is valid, based on the valid probability S0.

The determining subunit may include a random number determining module, which is executable by the processor 401. When being executed by the processor 401, the random number determining module is configured to determine a random number S from 1 to 100 and determine whether S is less than S0*100. When determining that S is less than S0*100, the determining subunit is further configured to determine whether the click operation is valid, otherwise, determine that the click operation is invalid.

One with ordinary skill in the art may understand that all of or part of the method in the foregoing embodiments may be completed with hardware or with related hardware instructed by a program. The program may be stored in a computer readable storage medium. The foregoing storage medium may be a read-only memory (ROM), a disk, a compact disc (CD), and so on.

Figure 5:
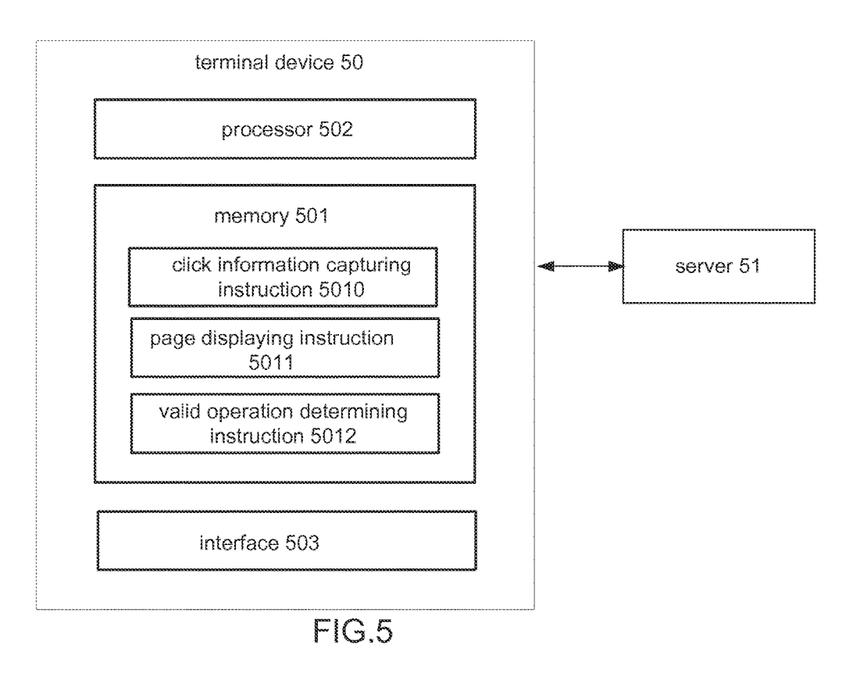
FIG. 5 is a diagram illustrating structure of a system for displaying recommended pages by a terminal device, according to various embodiments.

FIG. 5 is a diagram illustrating the structure of a system for displaying recommended pages by a terminal device, according to various embodiments of the present disclosure. The system may include a terminal device 50 and a server 51. Functions of the terminal device 50 and the server 51 are respectively similar to functions of the terminal device and server in the embodiment illustrated with FIG. 4.

The terminal device 50 may include a memory 501, a processor 502 in communication with the memory 501, and an interface 503. The memory 501 is configured to store a click information capturing instruction 5010, a page displaying instruction 5011, and a valid operation determining instruction 5012, which are executable by the processor 502. When being executed by the processor 502, the page displaying instruction 5011 indicates to display a page received from the server 51 via the interface 503, which includes the recommended information and the hotspot range. When being executed by the processor 502, the click information capturing instruction 5010 indicates to capture click information of a click operation, which is performed by a user on a display area of recommended information via a display screen, and transmit the click information to the server 51.

When being executed by the processor 502, the valid operation determining instruction 5012 indicates to determine whether the click operation is valid, based on the click information and hotspot range. When determining that the click operation is valid, the valid operation determining instruction 5012 further indicates to transmit a request for obtaining a recommended page corresponding to the recommended information to the server 51 and indicates to display the obtained recommended page.

When being executed by the processor 502, functions of the valid operation determining instruction 5012 may be similar to functions of the valid operation determining unit in the embodiment illustrated with FIG. 4, which will not be repeated here.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group)

that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A method for displaying a recommended page by a terminal device, comprising:
    displaying a page carrying recommended information;
    capturing click information of a click operation, which is performed by a user on a display area of the recommended information via a display screen;
    wherein the page includes a determined hotspot range, the hotspot range being determined after analyzing previous click information and valid information, and a valid click probability in the hotspot range is greater than a set probability value, wherein the valid information is correct operation information for effectively displaying the recommended information;
    determining whether the click operation is valid, based on the click information and the hotspot range;
    upon determining that the click operation is valid, transmitting a request for obtaining the recommended page corresponding to the recommended information to a server; and
    displaying the recommended page obtained;
    wherein the click information comprises click location information, the hotspot range comprises a hotspot area range, the hotspot area range is a range where the valid click probability is greater than an area set threshold;
    wherein determining whether the click operation is valid comprises:
    calculating a hotspot area probability S1, which comprises:
    calculating a distance L between a click operation location and a center of the hotspot area range, and calculating the hotspot area probability S1 based on S1=1/L; or
    determining whether the click operation location is within the hotspot area range;
    upon determining that the click operation location is within the hotspot area range, calculating the value of S1 to be 1; otherwise, calculating the distance L between the click operation location and the center of the hotspot area range, and calculating S1=1/L, taking the hotspot area probability S1 as a valid probability S0; and
    determining whether the click operation is valid, based on the valid probability S0.

2. The method according to claim 1, further comprising:
    determining the hotspot area range, which comprises:
    taking each location within the display area of the recommended information as a center of a circle, taking a length value less than a half height of the display area of the recommended information as a radius, traversing the display area of the recommended information and making statistics on the valid click probability within each circular area, and taking n circular area ranges with a maximum valid click probability as the hotspot area range, wherein n is a natural number.

3. The method according to claim 1, wherein the click information includes click location information and click duration information, the hotspot range includes a hotspot area range and a hotspot duration range, the hotspot area range is a location area range where the valid click probability is greater than an area set threshold, the hotspot duration range is a duration range where the valid click probability is greater than the probability set value, and the hotspot duration range is a duration range greater than T0;

wherein determining whether the click operation is valid comprises:
calculating a hotspot area probability S1, which comprises:
calculating a distance L between click operation location and a center of the hotspot area range, and calculating the hotspot area probability S1 based on S1=1/L; or,
determining whether the click operation location is within the hotspot area range;
upon determining that the click operation location is within the hotspot area range, calculating the value of S1 to be 1; otherwise, calculating S1=1/L;
calculating a time hotspot probability S2, which comprises:
calculating based on S2=1/(T0−t), by using a click duration t; or,
determining whether the click duration t is greater than or equal to the hotspot duration;
upon determining that the click duration t is greater than or equal to the hotspot duration, calculating the value of S2 to be 1; otherwise, calculating S2=1/(T0−t);
calculating a valid probability S0, which comprises S0=a*S1+b*S2, wherein a and b are two coefficients with constant weights;
and determining whether the click operation is valid, based on the valid probability S0.

4. The method according to claim 3, further comprising:
determining the hotspot area range, which includes:
taking each location within the display area of the recommended information as a center of a circle, taking a length value less than a half height of the display area of the recommended information as a radius, traversing the display area of the recommended information and making statistics on the valid click probability within each circular area, taking n circular area ranges with a maximum valid click probability as the hotspot area range, wherein n is a natural number;
wherein the method further comprises:
determining the hotspot duration range, which comprises:
analyzing the valid click probability corresponding to each click duration within the display area of the recommended information, obtaining a change relationship between the click duration and the valid click probability, taking a duration where the valid click probability trends stable as the duration hotspot, and taking a range greater than or equal to the duration hotspot as the hotspot duration range.

5. The method according to claim 1, wherein determining whether the click operation is valid based on the valid probability S0 comprises:
determining a random number S from 1 to 100;
determining whether S is less than S0*100;
upon determining that S is less than S0*100, determining that the click operation is valid.

6. A system for displaying a recommended page by a terminal device, wherein the system comprises a terminal device and a server;
the terminal device includes a first memory, a first processor in communication with the first memory, wherein the first memory stores computer readable instructions, when executed by the first processor, causing the first processor to:
display a page carrying recommended information, capture click information of a click operation, which is performed by a user on a display area of the recommended information via a display screen, wherein the page includes a determined hotspot range, wherein the hotspot range is a range determined after analyzing previous click information and valid information, and a valid click probability in the hotspot range is greater than a set probability value, the valid information is correct operation information for effectively displaying the recommended page;
determine whether the click operation is valid, based on the click information and the hotspot range;
upon determining that the click operation is valid, transmitting a request for obtaining the recommended page corresponding to the recommended information to the server, and displaying the obtained recommended page;
wherein the computer readable instructions further cause the first processor to;
display the page carrying the recommended information and the hotspot range received from the server, and transmit the hotspot range;
capture the click information of the click operation, which is performed by the user on the display area of the recommended information via the display screen, and transmit the click information to the server, and
determine whether the click operation is valid, based on the click information and the hotspot range;
upon determining that the click operation is valid, transmit the request for obtaining the recommended page corresponding to the recommended information to the server, and display the obtained recommended page;
wherein the click information comprises click location information, the hotspot range comprises a hotspot area range, the hotspot area range is a location area range where the valid click probability is greater than an area set threshold;
calculate a distance L between a click operation location and a center of the hotspot area range, and calculate a hotspot area probability S1 based on S1=1/L;
or, determine whether the click operation location is within the hotspot area range, upon determining that the click operation location is within the hotspot area range, calculate the value of S1 to be 1; otherwise, calculate the distance L between the click operation location and the center of the hotspot area range, calculate S1=1/L, take the hotspot area probability S1 as a valid probability S0, transmit the valid probability S0; and,
determine whether the click operation is valid, based on the valid probability S0;
wherein the server comprises a second memory, a second processor in communication with the second memory, wherein the second memory stores computer readable instructions, when executed by the second processor, causing the second processor to:
receive the click information from the terminal device, analyze the previous click information and the valid information, determine a range where the valid click probability is greater than the set probability value and take the determined range as the hotspot range;

when pushing the page carrying the recommended information to the terminal device, enable the page to carry the determined hotspot range and receive the request for displaying the recommended page from the terminal device and push the recommended page to the terminal device for displaying.

7. The system according to claim 6, wherein the click information includes click location information and click duration information, the hotspot range comprises a hotspot area range and a hotspot duration range, the hotspot area range is a location area range where the valid click probability is greater than an area set threshold, the hotspot duration range is a duration range where the valid click probability is greater than the set probability value, the hotspot duration range is a duration range greater than T0, wherein the computer readable instructions further cause the first processor to;

calculate a hotspot area probability S1, which comprises:

calculating a distance L between a click operation location and a center of the hotspot area range, and calculating the hotspot area probability S1 based on S1=1/L; or, determining whether the click operation location is within the hotspot area range, upon determining that the click operation location is within the hotspot area range, calculating the value of S1 to be 1; otherwise, calculating S1=1/L;

calculate a time hotspot probability S2, which comprises:

calculating based on S2=1/(T0−t), by using a click duration t, and obtaining the time hotspot probability S2; or, determining whether the click duration t is greater than or equal to a hotspot duration;

upon determining that the click duration t is greater than or equal to the hotspot duration, calculating the value of S2 to be 1; otherwise, calculating S2=1/(T0−t);

calculate a valid probability S0, which comprises:

S0=a*S1+b*S2, wherein a and b are two coefficients with constant weights;

transmit the calculated valid probability S0; and determine whether the click operation is valid, based on the valid probability S0.

8. The system according to claim 6, wherein the first processor is further caused to determine a random number S from 1 to 100, and determine whether S is less than S0*100; upon determining that S is less than S0*100, determining that the click operation is valid; otherwise, determining that the click operation is invalid.

9. A method for displaying a recommended page by a terminal device, comprising:

displaying a page carrying recommended information;

capturing click information of a click operation, which is performed by a user on a display area of the recommended information via a display screen;

wherein the page includes a determined hotspot range, the hotspot range being determined after analyzing previous click information and valid information, and a valid click probability is greater than a set probability value in the hotspot range, wherein the valid information is correct operation information for effectively displaying the recommended information;

determining whether the click operation is valid, based on the click information and the hotspot range;

upon determining that the click operation is valid, transmitting a request for obtaining the recommended page corresponding to the recommended information to a server; and displaying the recommended page obtained;

wherein the click information comprises click duration information, the hotspot range comprises a hotspot duration range, the hotspot duration range is a range where the valid click probability is greater than the set probability value, and the hotspot duration range is a duration range greater than T0;

wherein determining whether the click operation is valid comprises:

calculating a time hotspot probability S2, which comprises:

calculating based on a formula S2=1/(T0−t), by using a click duration t, and obtaining the time hotspot probability S2; or, determining whether the click duration t is greater than or equal to a hotspot duration;

upon determining that the click duration t is greater than or equal to the hotspot duration, calculating the value of S2 to be 1; otherwise, calculating S2=1/(T0−t); taking the time hotspot probability S2 as the valid probability S0;

and determining whether the click operation is valid, based on the valid probability S0.

* * * * *